US012434254B2

(12) United States Patent
Breeden

(10) Patent No.: US 12,434,254 B2
(45) Date of Patent: Oct. 7, 2025

(54) TRIPLE SHOT SPRAY ATTACHMENT

(71) Applicant: Danny Breeden, Midwest City, OK (US)

(72) Inventor: Danny Breeden, Midwest City, OK (US)

( * ) Notice: Subject to any disclaimer, the term of this patent is extended or adjusted under 35 U.S.C. 154(b) by 278 days.

(21) Appl. No.: 18/445,511

(22) Filed: Sep. 13, 2023

(65) Prior Publication Data

US 2025/0083163 A1 Mar. 13, 2025

(51) Int. Cl.

*B05B 12/32* (2018.01)
*B05B 1/14* (2006.01)
*B05B 7/24* (2006.01)
*B05B 15/40* (2018.01)
*B05B 15/652* (2018.01)

(52) U.S. Cl.

CPC .............. *B05B 7/2486* (2013.01); *B05B 1/14* (2013.01); *B05B 12/32* (2018.02); *B05B 15/40* (2018.02); *B05B 15/652* (2018.02)

(58) Field of Classification Search

CPC .... B05B 1/14; B05B 1/28; B05B 7/08; B05B 7/2486; B05B 9/035; B05B 9/0423; B05B 12/32; B05B 12/36; B05B 15/40; B05B 15/65; B05B 15/652; B05B 15/654; B05B 15/68

See application file for complete search history.

(56) References Cited

U.S. PATENT DOCUMENTS

| | | | | | |
|---|---|---|---|---|---|
| 2,696,449 | A * | 12/1954 | Ericks | B05B 12/00 | 118/313 |
| 3,561,398 | A * | 2/1971 | Rose | B05B 12/122 | 901/14 |
| 3,885,066 | A * | 5/1975 | Schwenninger | B05B 13/0473 | 427/314 |
| 3,893,630 | A * | 7/1975 | Bochmann | F16L 37/53 | 239/587.5 |
| 5,295,626 | A * | 3/1994 | Mirabito | B05B 9/0423 | 239/526 |
| 5,372,389 | A * | 12/1994 | Tam | F16L 27/093 | 285/190 |
| 5,571,562 | A * | 11/1996 | Wakat | B05B 7/2494 | 427/280 |
| 5,957,386 | A | 9/1999 | Bialke | | |
| 6,042,029 | A * | 3/2000 | Massey | B05B 15/652 | 239/548 |
| 8,292,332 | B2 * | 10/2012 | Mitchell | F16L 27/093 | 285/190 |
| 9,061,299 | B1 * | 6/2015 | Fodor | B05B 1/20 | |
| 2002/0096579 | A1 | 7/2002 | Sinders | | |
| 2004/0124284 | A1 * | 7/2004 | Melendez | B05B 1/3006 | 239/566 |

(Continued)

FOREIGN PATENT DOCUMENTS

| | | | |
|---|---|---|---|
| CN | 206951457 | | 4/2017 |
| CN | 206951457 | U * | 2/2018 |

(Continued)

*Primary Examiner* — Darren W Gorman
(74) *Attorney, Agent, or Firm* — Randal D. Homburg

(57) ABSTRACT

A triple shot spray attachment for a pressurized spray provides three independently adjustable spray nozzles for application of paint, coatings or fluids to both flat and contoured surfaces and shaped objects, and is fully disassembled after use for cleaning.

4 Claims, 8 Drawing Sheets

(56) References Cited

U.S. PATENT DOCUMENTS

| | | | | |
|---|---|---|---|---|
| 2017/0136471 | A1* | 5/2017 | Cowan | B05B 13/0278 |
| 2018/0117608 | A1* | 5/2018 | Cole | B05D 7/26 |

FOREIGN PATENT DOCUMENTS

| | | | | | |
|---|---|---|---|---|---|
| CN | 213727266 | U | * | 7/2021 | |
| CN | 115569752 | | | 9/2022 | |
| CN | 115569752 | A | * | 1/2023 | B05B 1/3489 |

* cited by examiner

TRIPLE SHOT SPRAY ATTACHMENT

CROSS REFERENCE TO RELATED APPLICATIONS

None.

I. BACKGROUND OF THE INVENTION

1. Field of Invention

An airless sprayer attachment to apply a liquid material to surfaces provides three spray heads, including a central fixed position spray head and two outer multiple position spray head extending from a common spray manifold to increase the spray coverage width and spray contour of the liquid materials being applied with the airless sprayer and this attachment, adjusted to suit the surface and contour of a target being sprayed.

2. Description of Prior Art

A preliminary review of prior art patents was conducted by the applicant which reveal prior art patents in a similar field or having similar use. However, the prior art inventions do not disclose the same or similar elements as the present spray attachment, nor do they present the material components in a manner contemplated or anticipated in the prior art.

A multi-path spray gun is disclosed in U.S. Pat. No. 5,957,386 to Bialke which disperses atomized fluids to a surface. It spray nozzles are in a fixed position and provide intersecting coverages and uses pressurized air to conduct its application. In U.S, Patent Publication 2002/0096579 to Sinders, an airless spray nozzle provides for variable angular application of its liquids to a surface between 0 and 60 degrees and adjusts the width of the spray.

As a matter of disclosure only, three Chinese patents are referenced to indicate triple output spray nozzles which are attached to a unitized dispersion appliance in Chinese Patents No. CN 213727266 and CN 206951457, while Chines Patent No. CN 115569752 provides a common spray attachment with a central spray nozzle and multiple peripheral spray nozzles in a common spray nozzle.

None of the discovered prior art discloses the central fixed position spray extension with two adjacent adjustable spray wands, multiple adjustable spray heads or independently adjustable triple or more spray heads.

II. SUMMARY OF THE INVENTION

The application of coatings or forced pressure spraying is used in painting, washing, application of coal tar epoxies and other special coatings, most often by professionals. They use air application devices, where pressurized air is used to atomize and project these coatings and also airless devices which apply coatings directly from a production source, including cans, tubs, and other containers. These spray devices use application tips that spread the atomized and create aerosols which distribute the paint in selected patterns and in selected quantities.

The present triple shot spray adapter applies the coatings in greater quantities and with greater efficiencies than single spray heads or other multiple head sprayers, by placing three application heads in a three dimensional array which is multiply adjusted for targets that are flat or not flat surfaces, including rounded surfaces shaped surfaces, multiple shaped surfaces, ples and corners. This three dimensional spray capacity is provided by three independently adjustable spray nozzles on three independent spray arms, each spray arm and nozzle fully adjustable from 1 to 360 degrees. The three spray arms are provided in several selected lengths to increase the spread of the aerosol coating, adjust the spray pattern for non-flat surfaces or reduce the spray pattern for tighter or more concentrated spray treatments, as subjectively desired by the user. The arms may be directed parallel or in different directions to effect the contours of the target object being treated or coated, as indicated in the drawing figures.

The triple shot spray adapter is able to be fully disassembled for cleaning after use with common tools already used in the spray coating industry. It is also supplied with metric and American standard dimensions. It may be used with a single gun, extension pole or multiple guns from a common source. It may also be connected to industrial power washers. Prior art devices do not present any sprayer with the same elements and combinations as the triple shot spray adapter, nor do they combine to anticipate the assembled components in the same manner as the present triple shot spray adapter.

III. DESCRIPTION OF THE DRAWINGS

The following drawings are submitted with this utility patent application.

FIG. 9A is a view of the triple shot being used to spray a liquid on a round post.

FIG. 9B is a view of the triple shot being used to spray a liquid on a square object.

FIG. 9C is the triple shot being used to spray a liquid on a rounded surface.

IV. DESCRIPTION OF THE PREFERRED EMBODIMENT

Figure 1:
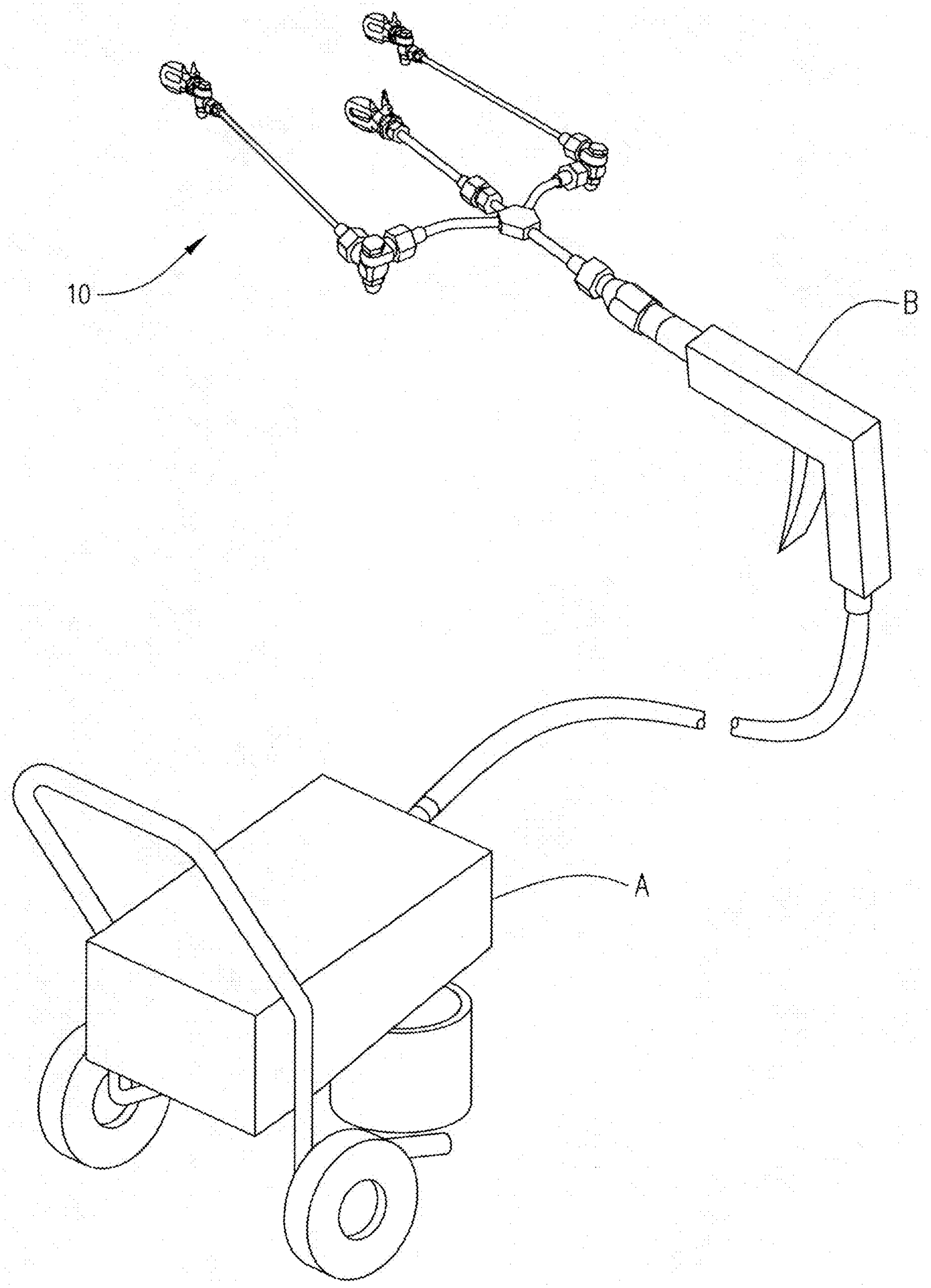
FIG. 1 is a perspective view of the triple shot spray attachment connecting to the nozzle of a pressurized spray device.
Figure 2:
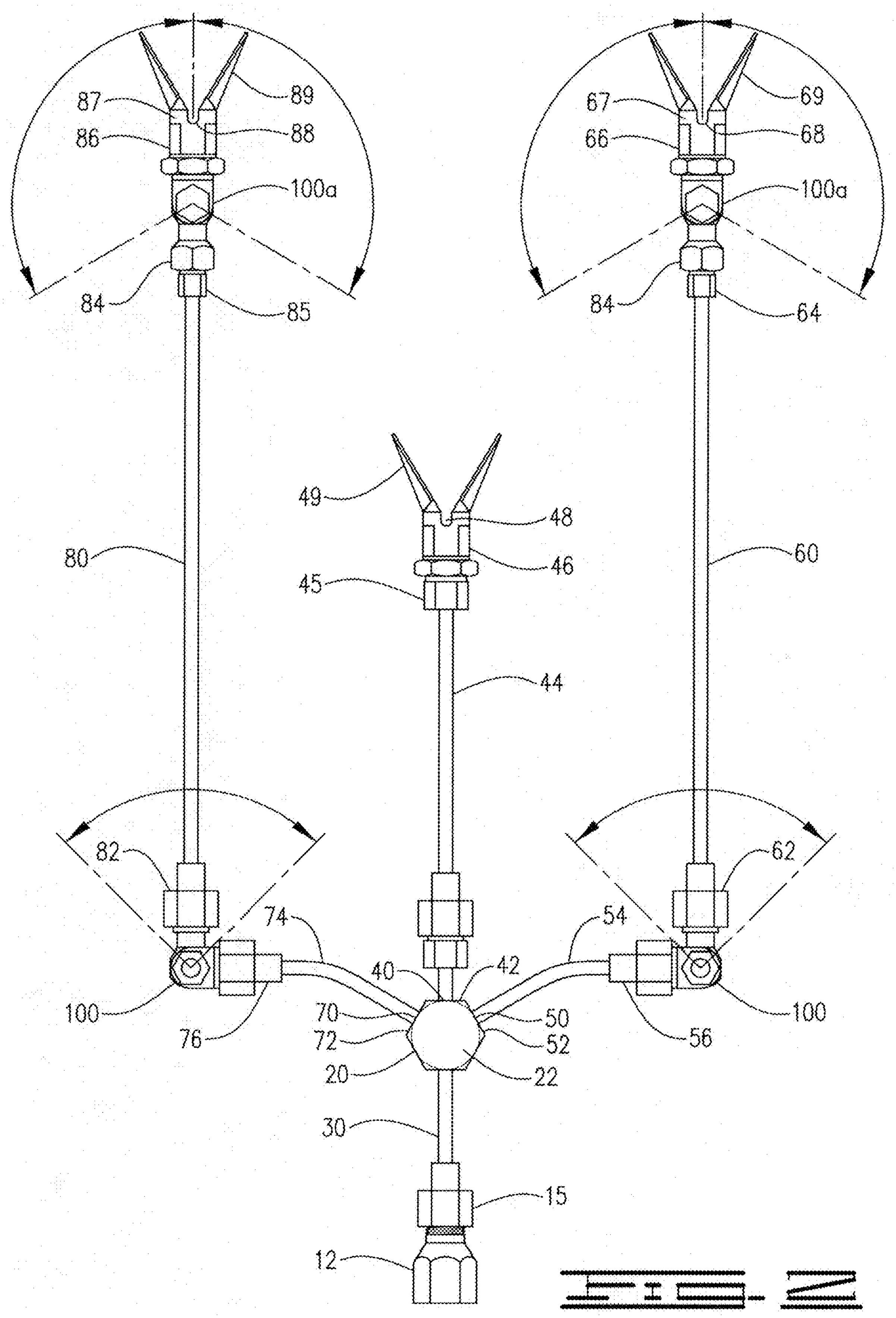
FIG. 2 is a top view of the triple shot spray apparatus indicating movement of the adjustable swivel elbows.
Figure 3:
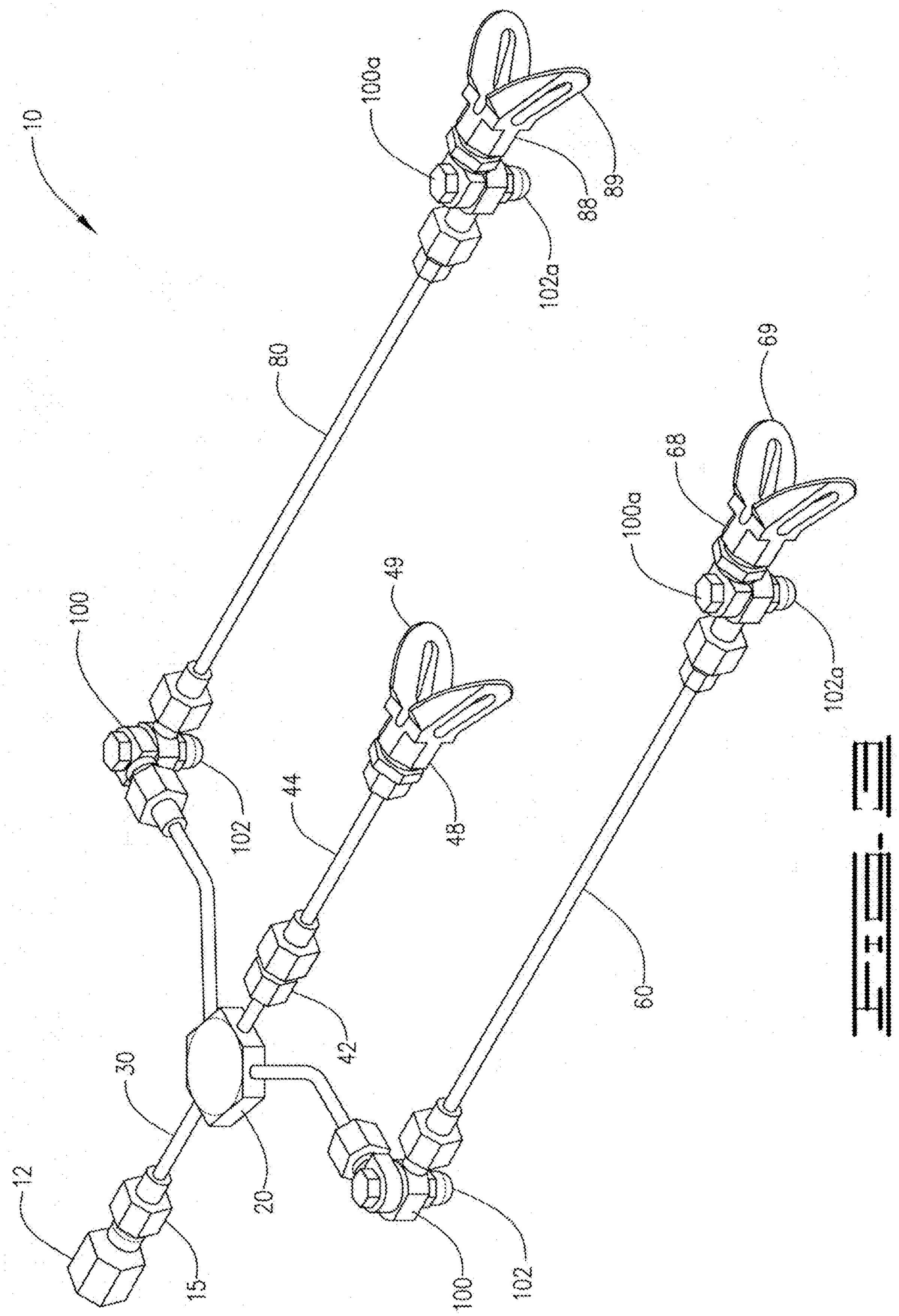
FIG. 3 is a perspective view of the triple shot spray attachment.
Figure 4:
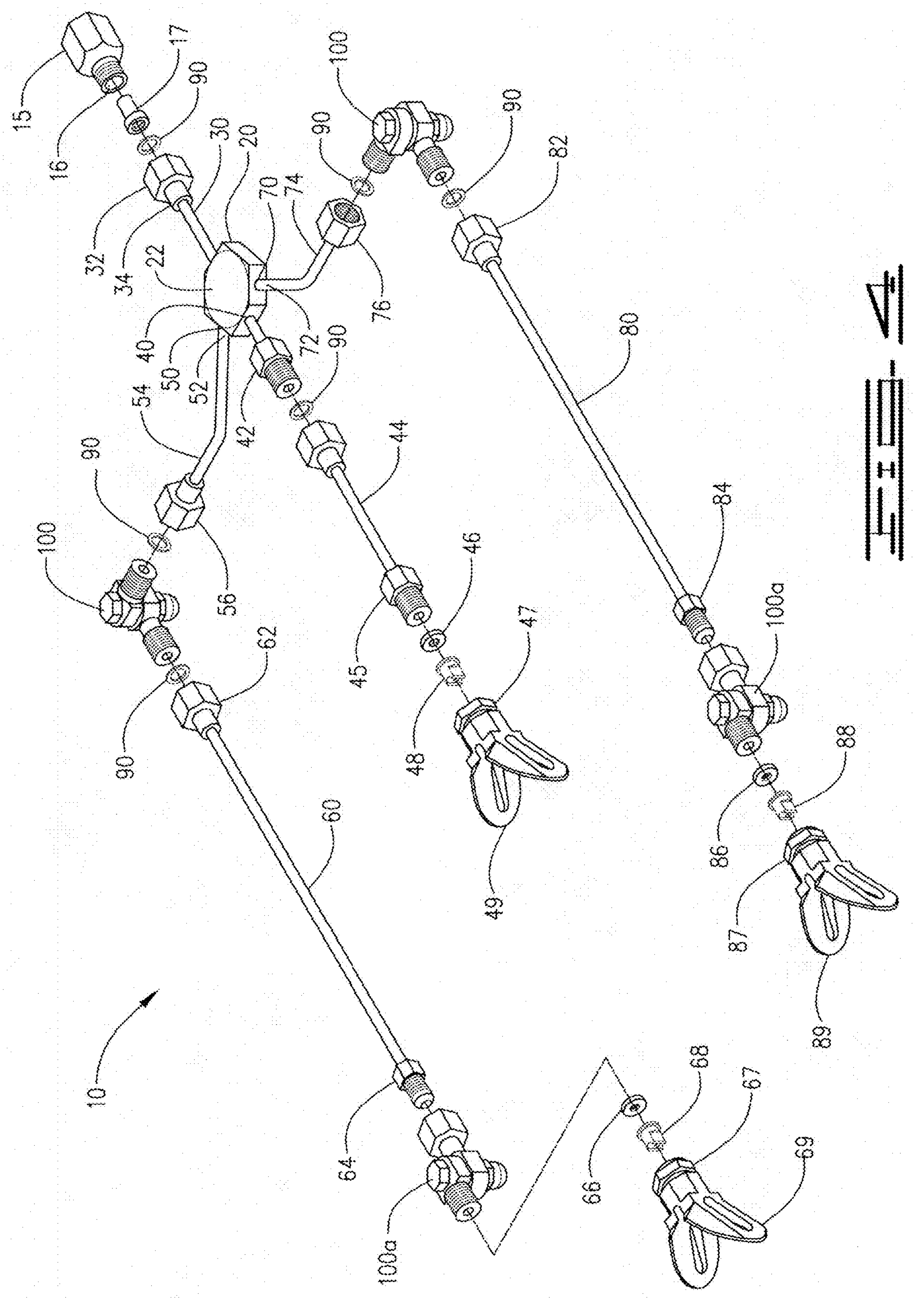
FIG. 4 is an exploded view of the triple shot spray attachment.

A triple shot spray attachment 10 for a pressurized spray device A provides an expanded spray pattern for increased application and also for a contoured spray target. The triple shot spray attachment has a filter body 15 that attaches to the spray gun B of the pressurized spray device A, FIG. 1. The filter body 15 has multiple adapters 12 which provide for universal attachment to the spray gun B, both metric and American standard, with multiple thread offerings. The filter body 15 has an internal passage 16 which provides for the insertion of a disposable internal filter 17, FIG. 4.

A triple shot separator manifold 20, FIGS. 1-4 and 9A-9C, has a lower extension 34 fitting to the filter body 15 and inserting into a lower end 32 of a separator body 22 by a straight lower hollow tube 30. The triple shot separator manifold 20 evenly distributes fluid flow through the separator manifold 20 to an upper port 40, a right side port 50 and a left side port 70. Each port defines a respective port fitting 42, 52, 72. The upper port is attached to a tubular extension 44 which provides for attachment to a first nozzle fitting 45 using a filter boss 46 and a flat tip spray nozzle 48. Optionally, the first nozzle fitting 45 may be attached directly to the upper port fitting 42 using the filter boss 46 and flat spray tip nozzle 48, not shown. Each left and right side ports 50, 70 are attached to shaped tubing 54, 74, each respective tubing defining a respective right and left terminal port fitting 56, 76.

Figure 5:
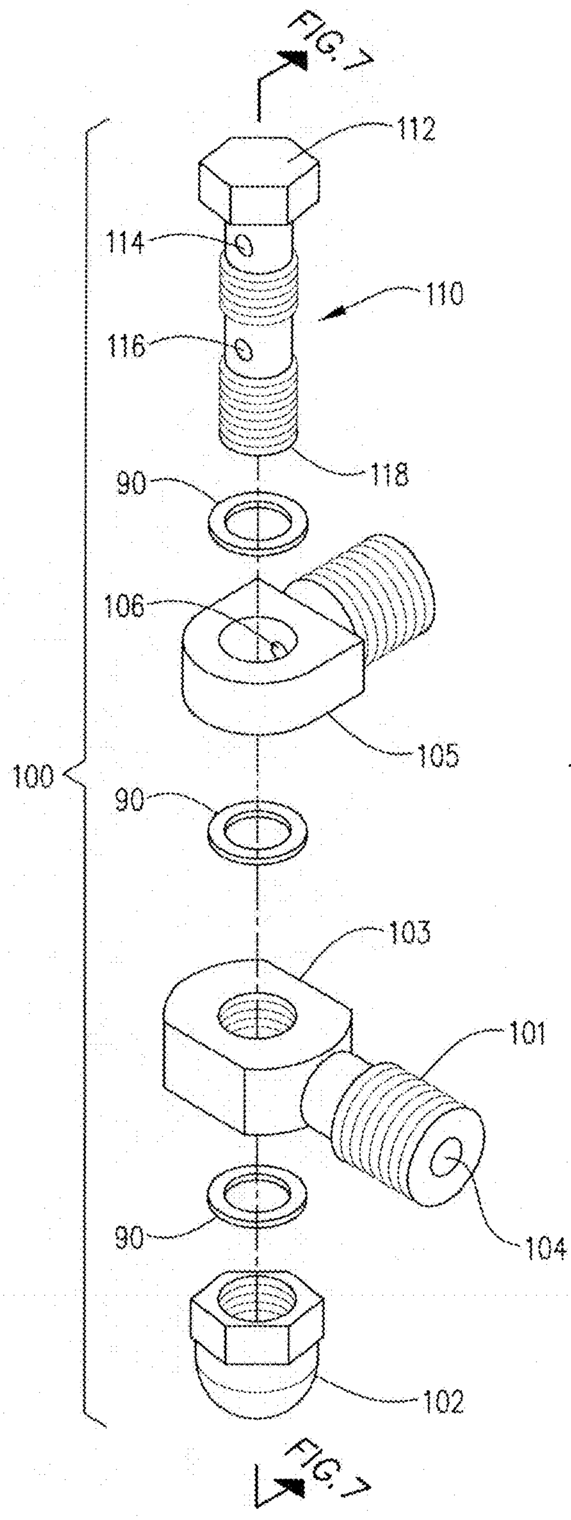
FIG. 5 is an exploded view of a left swivel elbow.
Figure 6:
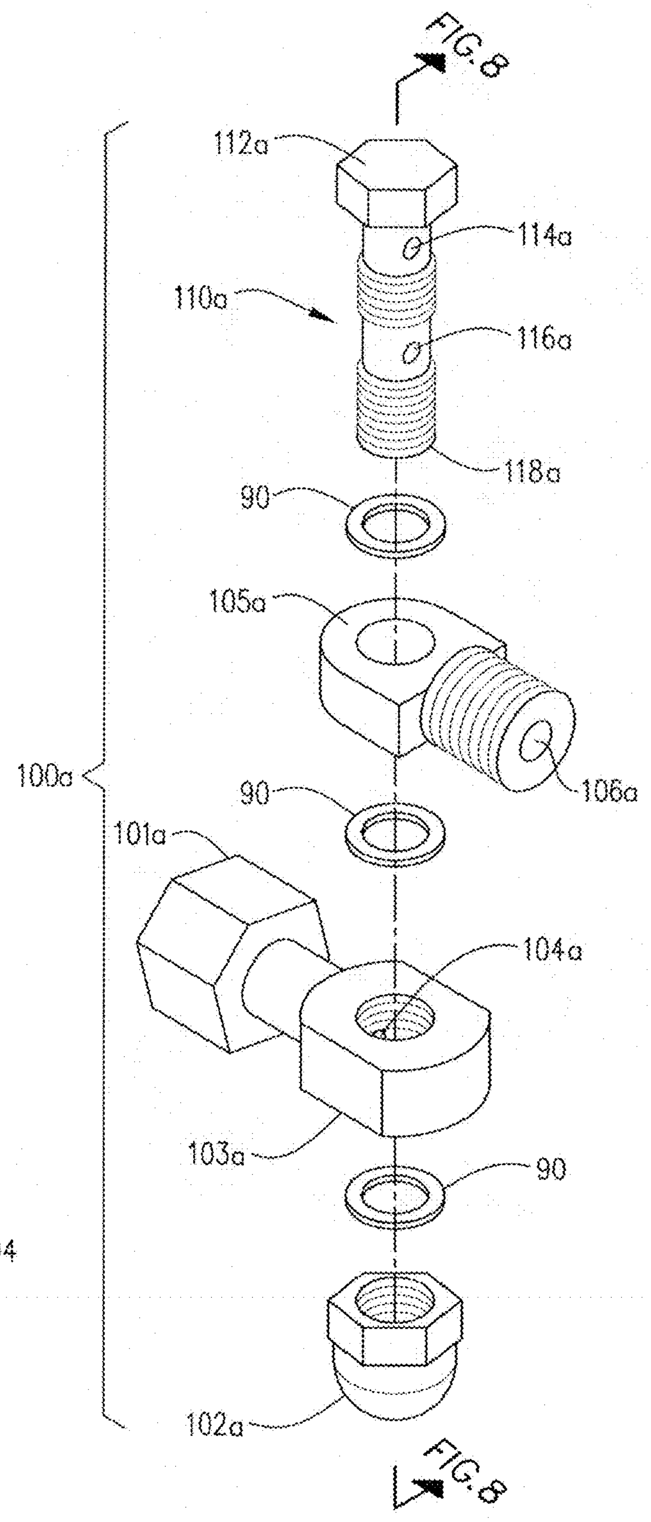
FIG. 6 is an exploded view of a right swivel elbow.
Figure 7:
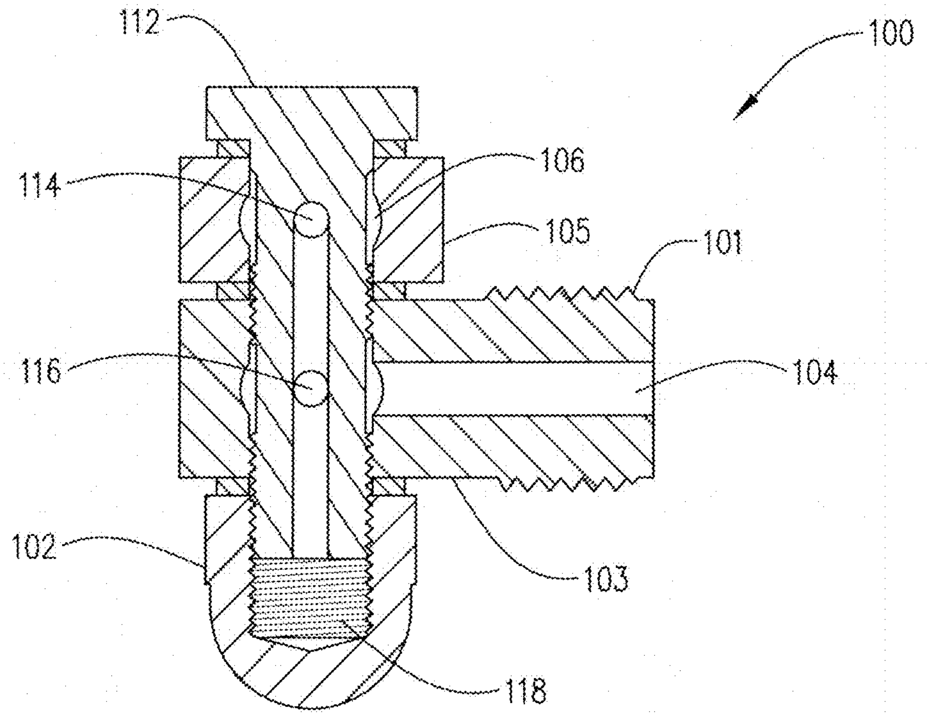
FIG. 7 is a sectional view of the left swivel elbow along section lines 7/7 of FIG. 5.
Figure 8:
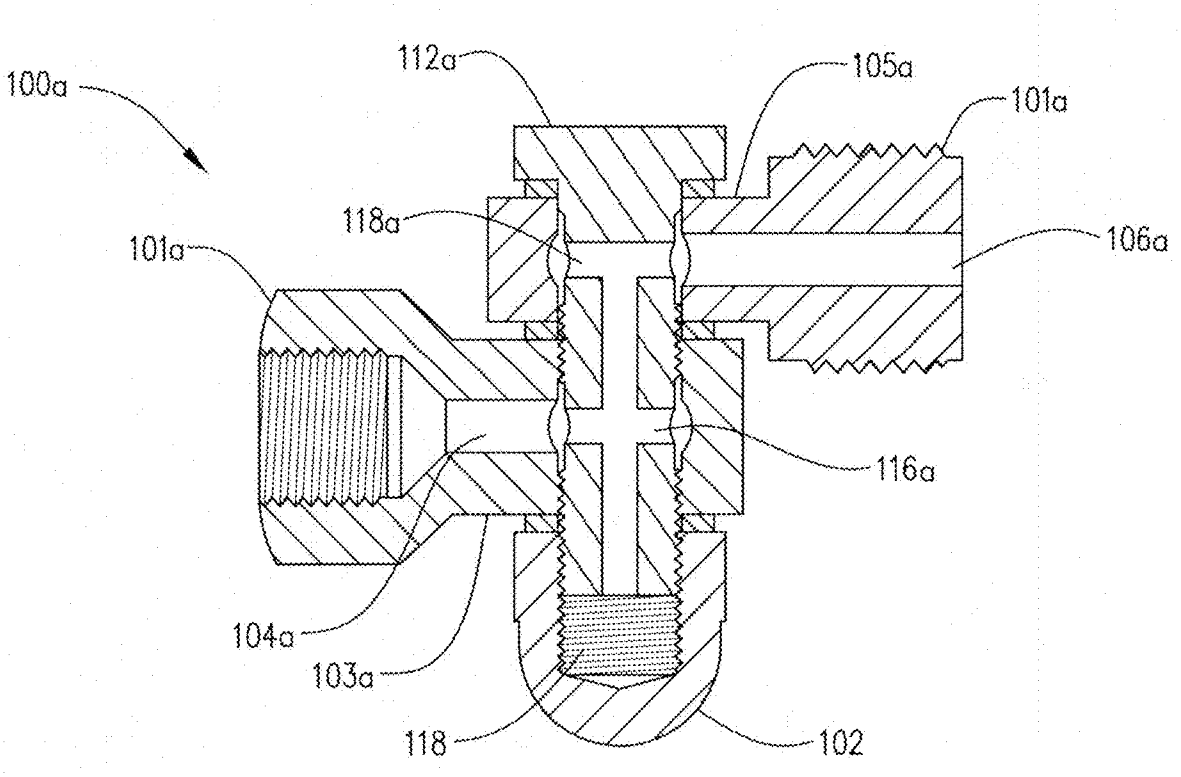
FIG. 8 is a sectional view of the right swivel elbow along section lines 8/8 of FIG. 6.
Figure 13:
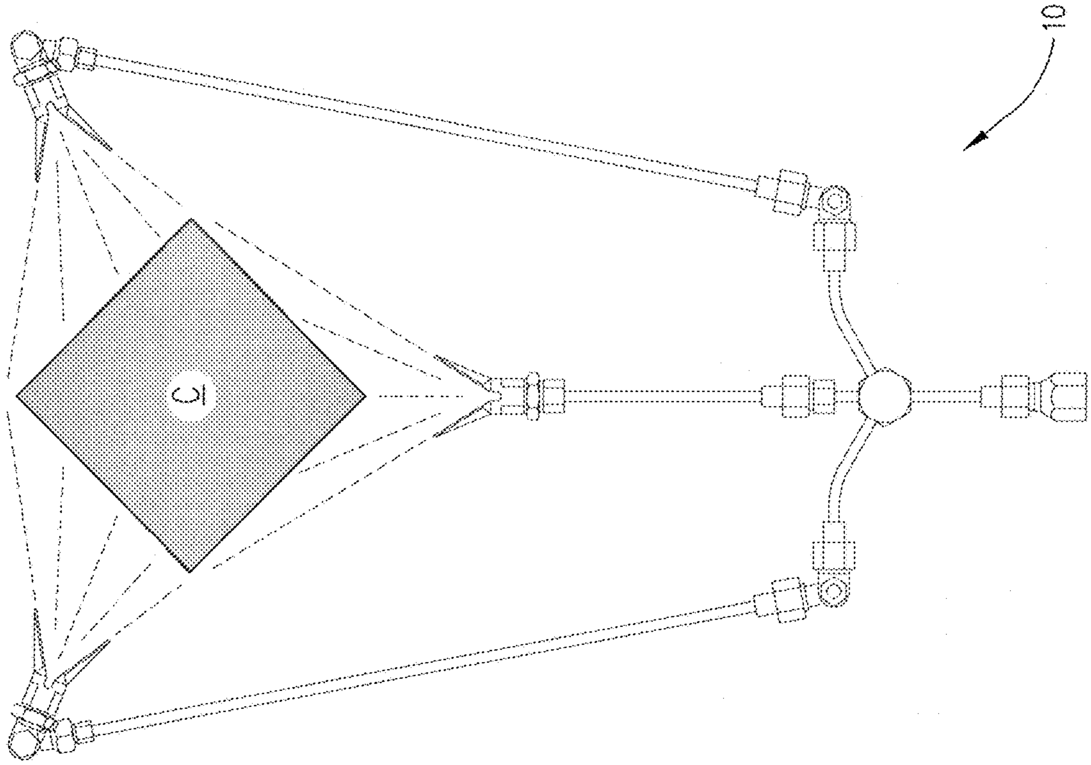
Figure 14:
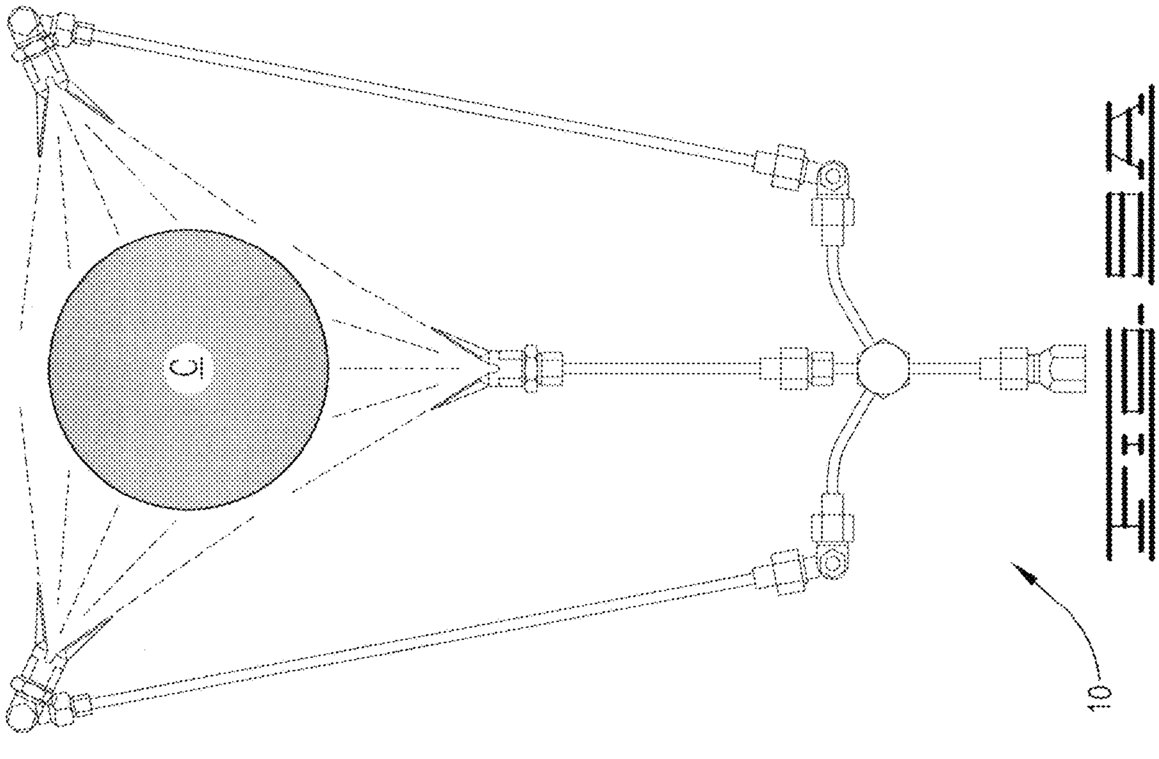
Figure 8:
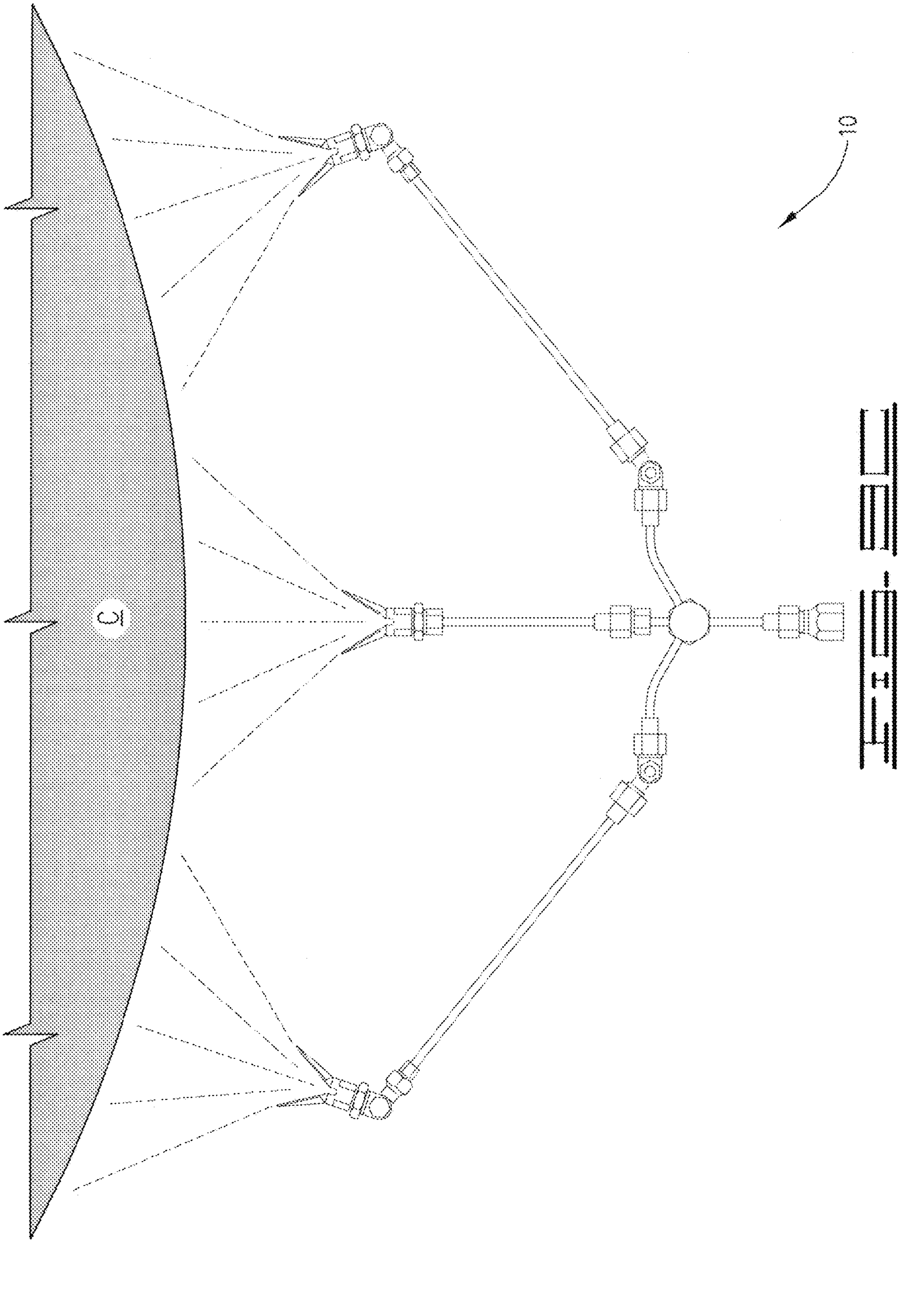

A left swivel elbow 100 is attached to the left side port 50 and a right swivel elbow 100 is attached to the right side port 70. These left and right swivel elbows 100 are independently adjustable. Each swivel elbow 100, FIGS. 5-8, comprises a lower end cap 102, a first washer 90, a lower elbow member 103 with a central channel 104, a second washer 90, an upper elbow member 105 with a central channel 106, a third washer 90 and a threaded bolt 110 defining a head 112 and a lower end 118, and an upper and lower fluid channel 114, 116, adjusted to provide a swivel capacity to each respective swivel elbow 100 with an unrestricted flow pathway to transport liquids, FIGS. 5 and 7.

A left tubing extension 80, having a lower connecting housing 82 and an upper threaded connecting end 84, is further attached to the left lower swivel elbow 100, while a right tubing extension 60, also having a lower connecting housing 62 and an upper threaded connecting end 64, is further attached to the right lower swivel elbow 100 and directed to a location as chosen by the user for the intended project use. Nylon washers 90 are used in the connection of the respective tubing extensions 60, 80 and lower swivel elbows 100.

An upper swivel elbow 101a is attached to each upper threaded connecting end 64, 84, of the left and right tubing extension 60, 80, each upper swivel elbow 100*a* having a pivot capacity of 0 to 360 degrees with respect to the line of the respective right and left tubing extensions 60, 80. Each upper swivel elbow 101*a* is further connected to a respective second and third nozzle fitting 65, 85, using a filter boss 66, 86, and a flat tip spray nozzle 68, 88. A respective nozzle body 67, 87 is attached to each first and second nozzle fitting 65, 85, which can also attach a respective plastic safety cap 69, 89. In certain circumstances, special adapters may be used to provide mated threaded connections to allow the first and second nozzle fittings to be adapted to various manufacturers' nozzle bodies, including those employing metric connections and or American standard connections, not shown.

Once the basic assembly is made, the triple shot spray attachment 10 can be adjusted to position each nozzle to a particular angle and direction relative to the spray gun, FIGS. 2 and 9A-9C. Also, each tubing extension 44 and tubing extension 60, 80, can be provided with more than one length. During testing of the product, it was found that each tubular extension 44 could be best suited embodied as a 3", 6" and 12" length, and also for each tubing extension 60, 80. Once assembled, the triple shot spray attachment 10 can be used with a high pressure power washer, an airless paint sprayer, an air compressor, and air pressurized painting device, an epoxy applicator, tar coatings, undercoating applicators, coal tar epoxy application devices, and bed-liner application devices. The triple shot spray attachment 10 may be fully disassembled after use for complete cleaning of the outside and inside surfaces into individual components as shown in the exploded view, FIG. 4. It is common in the industry to simply discard the disposable internal filter 17 and/or each filter boss 46, 66, 86, after each use, since these are generally presented as a cheap and disposable component and troublesome to clean.

The materials used in the triple shot spray attachment 10 are primarily metal, which would include aluminum, stainless steel or other corrosion-resistant metal which can be cleaned with a compatible solvent or water, depending on the product being applied. The washers 90 are already referenced as nylon, but they may be made of any polymeric material which possesses the quality of resilience and resistance to chemical solvents and cleaning products. Materials already on the market which are tested and true are also recommended. If a product is damaged during repeated use, after-market replacement parts are included in this disclosure.

As shown in FIGS. 2-8, the connections between components is generally an outer threaded component with an inner threaded components, or tubing inserted within a port. In the case of the outer threaded and inner threaded components, the drawings are merely to be construed as one embodiment. This in no way dictates that the inner threaded component and outer threaded components are incapable of being presented in reverse. Thus, for example, the swivel elbows 100, 100*a* may have two elbow members 103, 105, 103*a* and 105*a* comprising threaded elbow connections 101, 101*a*, defining two outer threaded components, one outer and one inner threaded component, or two inner threaded components, with the mating element adapted to connect to the respective presented elbow member connector, 101, 101*a*. This is true with all the connections within the triple shot spray attachment 10.

While the triple shot spray attachment 10 has been particularly shown and described with reference to a preferred embodiment thereof, it will be understood by those skilled in the art that changes in form and detail may be made therein without departing from the spirit and scope of the invention.

What is claimed is:

1. A triple shot spray attachment, attaching to a spray nozzle of a spray device, comprising:

a filter body containing an internal filter connecting said spray nozzle of said spray device to said filter body;

tubing attaching said filter body to a separator manifold at a lower end of the separator manifold, said separator manifold further defining an upper port, a right side port and a left side port, the separator manifold evenly distributing a liquid from said lower end to each of said upper port, said right side port and said left side port;

a tubular extension directing a flow of said liquid from said upper port to a first nozzle fitting and to a first spray nozzle;

a right side shaped tubing connecting from said right side port to a right side lower swivel elbow, said right side lower swivel elbow connecting to a right side tubing extension, said right side tubing extension connecting to a right side upper swivel elbow, which connects to a second nozzle fitting and to a right side spray nozzle, said right side upper and lower swivel elbows providing rotation from 0-360 degrees;

a left side shaped tubing connecting from said left side port to a left side lower swivel elbow, said left side lower swivel elbow connecting to a left side tubing extension, said left side tubing extension connecting to a left side upper swivel elbow, which connects to a third nozzle fitting and to a left side spray nozzle, said left side upper and lower swivel elbows providing rotation from 0-360 degrees, wherein said triple shot spray attachment has the capacity to apply three equal flows of said liquid contemporaneously to a surface or a shaped target object.

2. The triple shot spray attachment of claim 1, wherein:

said upper port includes a first port fitting from which said tubular extension extends, with said first nozzle fitting connecting to a filter boss, which is attached to said first spray nozzle and to a nozzle body having a safety cap;

said right side port attaches to said right side shaped tubing through a right side port fitting, said right side shaped tubing defining a right side terminal port fitting attaching to said right side lower swivel elbow, said right side lower swivel elbow attaching to a lower connecting housing of said right side tubing extension, said right side tubing extension further defining an upper threaded connecting end, to which said right side upper swivel elbow attaches, with said second nozzle fitting connecting to a filter boss, which is attached to said right side spray nozzle and to a right side nozzle body having a safety cap;

said left side port attaches to said left side shaped tubing through a left side port fitting, said left side shaped tubing defining a left side terminal port fitting attaching to said left side lower swivel elbow, said left side lower swivel elbow attaching to a lower connecting housing of said left side tubing extension, said left side tubing extension further defining an upper threaded connecting end, to which said left side upper swivel elbow attaches, with said third nozzle fitting connecting to a filter boss, which is attached to said left side spray nozzle and to a left side nozzle body having a safety cap, wherein each of said spray nozzles may be independently directed to different locations on a common target contemporaneously.

3. The triple shot spray attachment of claim 2, wherein each respective connection located between said filter body and said tubing, between said first port fitting and said tubular extension, between said right side terminal port fitting and said right side lower swivel elbow, and between said left side terminal port fitting and said left side lower swivel elbow, includes a washer to seal the respective connection, and wherein the washers are made from a material selected from nylon, or any polymeric material which possesses the material quality of resilience and resistance to chemical solvents and cleaning products.

4. The triple shot spray attachment of claim 1, wherein each of said right side and left side upper and lower swivel elbows further comprises:

an elbow member connector extending from each of an upper elbow member and a lower elbow member, wherein each of said upper and lower elbow members defines a respective central channel; and a threaded bolt defining a head, an integrated upper fluid channel, an integrated lower fluid channel, and a lower end with a lower end cap securing said lower end of said bolt to pivotally attach said upper elbow member to said lower elbow member, thereby providing liquid flow from said lower elbow member to said upper elbow member through the combined and connected central channels and said upper and lower fluid channels, whereby said liquid flows freely from said spray device through all three spray nozzles equally and without restriction to fluid flow.

* * * * *